(12) United States Patent
Oh et al.

(10) Patent No.: US 10,670,234 B1
(45) Date of Patent: Jun. 2, 2020

(54) ADJUSTABLE HALO FOR DISPLAY BIAS LIGHTING

(71) Applicant: Dell Products, L.P., Round Rock, TX (US)

(72) Inventors: Guentaek Oh, Paju (KR); Daehyun Kim, Huaseong (KR)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/532,025

(22) Filed: Aug. 5, 2019

(51) Int. Cl.
*F21V 14/04* (2006.01)
*G06F 1/16* (2006.01)
*F21V 7/00* (2006.01)
*F21V 33/00* (2006.01)

(52) U.S. Cl.
CPC ............ *F21V 14/04* (2013.01); *F21V 7/0008* (2013.01); *F21V 33/0052* (2013.01); *G06F 1/1601* (2013.01); *G06F 1/1637* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,191,939 B1 * | 2/2001 | Burnett | ............... | G06F 1/1616 361/679.1 |
| 6,977,808 B2 * | 12/2005 | Lam | ................... | G06F 1/1616 361/679.24 |
| 8,305,746 B2 * | 11/2012 | Yokoyama | ............. | G06F 1/1637 349/58 |
| 8,325,472 B2 * | 12/2012 | Wang | .................... | G06F 1/1686 312/223.1 |
| 8,641,217 B2 * | 2/2014 | Hirano | ................... | G09F 13/04 361/679.01 |
| 9,052,085 B2 * | 6/2015 | Chan | ................... | H01L 25/0753 |
| 9,476,566 B2 * | 10/2016 | Lu | ........................... | F21V 13/04 |
| 10,180,534 B2 * | 1/2019 | Oh | .......................... | G06F 1/1637 |
| 2011/0002682 A1 * | 1/2011 | Messina | ................ | F21V 7/0008 396/200 |
| 2012/0262902 A1 * | 10/2012 | Pickard | .................... | F21S 8/026 362/84 |
| 2013/0120921 A1 * | 5/2013 | Hsieh | .................... | H01L 31/052 361/679.08 |
| 2015/0163928 A1 * | 6/2015 | Cho | .................. | G02F 1/133608 362/97.1 |

* cited by examiner

Primary Examiner — Lisa Lea-Edmonds
(74) Attorney, Agent, or Firm — Fogarty LLP

(57) ABSTRACT

An external display may support bias lighting via lights located on the rear of the display. Embodiments provide a baffle connected to the rear of the display such that the baffle redirects light output from the rear-facing bias lights. Rather than redirect bias light output off a surface behind the display, embodiments provide a known surface for redirecting bias light output towards the front side of a display. A multi-segment baffle may be adjusted by articulating segments of the baffle and modifying the angles of redirection of the bias light output. Such adjustments modify the size of an opening between the baffle and the display and thus alter the characteristics of the bias light output. An inner surface of the baffle may be coated with a reflective material to improve efficiency. The baffle may be formed from a portion of a rear cover of the display.

20 Claims, 5 Drawing Sheets

US 10,670,234 B1

ADJUSTABLE HALO FOR DISPLAY BIAS LIGHTING

FIELD

This disclosure relates generally to displays for Information Handling Systems (IHSs), and more specifically, to bias lighting for displays.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may utilize a wide variety of displays. Certain IHSs, such a portable IHSs, utilize integrated displays. Some IHSs may also support the use of an external display. In some scenarios, IHSs may be coupled to television sets, such that the television is utilized as an external display of the IHS. Some displays that may be coupled to an IHS, including television sets, may support the use of bias lighting via one or more light sources that are located on the back of the display and are operated to illuminate surfaces or objects that are behind the display. Bias lighting may be used to improve the user's perception of the output of the display, to reduce eyestrain and/or as decorative lighting.

SUMMARY

In various embodiments, a display is provided for presenting information generated by an Information Handling System (IHS). The display includes: a screen positioned on a front side of the display; a plurality of bias lights positioned on a rear side of the display; and a baffle connected to the rear side of the display, wherein the baffle redirects light output from the plurality of bias lights.

In additional display embodiments, the baffle redirects light towards the front side of the display. In additional display embodiments, the baffle is adjustable to modify one or more angles of redirection of the bias light output. In additional display embodiments, the adjustment of the baffle changes a size of an opening between the baffle and the display. In additional display embodiments, a portion of an inner surface of the baffle is coated with a reflective material. In additional display embodiments, the baffle is formed from a portion of a rear cover of the display. In additional display embodiments, one or more of the bias lights are positioned proximal to an edge of the display and wherein the baffle is connected to the rear side of the display distal from the edge of the display. In additional display embodiments, one or more of the bias lights are tilted towards the nearest edge of the display. In additional display embodiments, the bias lights dissipate heat via a heat sink capability of the display. In additional display embodiments, the baffle extends along at least three edges of the display.

In various additional embodiments, a system is provided for use with a display that includes a screen positioned on a front side of the display and also includes a plurality of bias lights positioned on a rear side of the display. The system also includes a baffle connected to the rear side of the display, wherein the baffle redirects light output from one or more of the plurality of bias lights, wherein the light output is redirected by the baffle towards the front side of the display.

In various additional embodiments, a system includes an Information Handling System (IHS) that includes one or more processors and a memory device coupled to the one or more processors, the memory device storing computer-readable instructions that, upon execution by the one or more processors, cause the IHS to generate bias lighting control signals. The system also includes a display that includes a screen positioned on a front side of the display; a plurality of bias lights positioned on a rear side of the display, wherein the plurality of bias light are operated based on the bias lighting control signals generated by the IHS; and a baffle connected to the rear side of the display, wherein the baffle redirects light output from the plurality of bias lights.

In additional system embodiments, the baffle is adjustable to modify one or more angles of redirection of the bias light output. In additional system embodiments, the adjustment of the baffle changes a size of an opening between the baffle and the display. In additional system embodiments, a portion of an inner surface of the baffle is coated with a reflective material. In additional system embodiments, the baffle extends along at least three edges of the display. In additional system embodiments, the baffle redirects light towards the front side of the display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
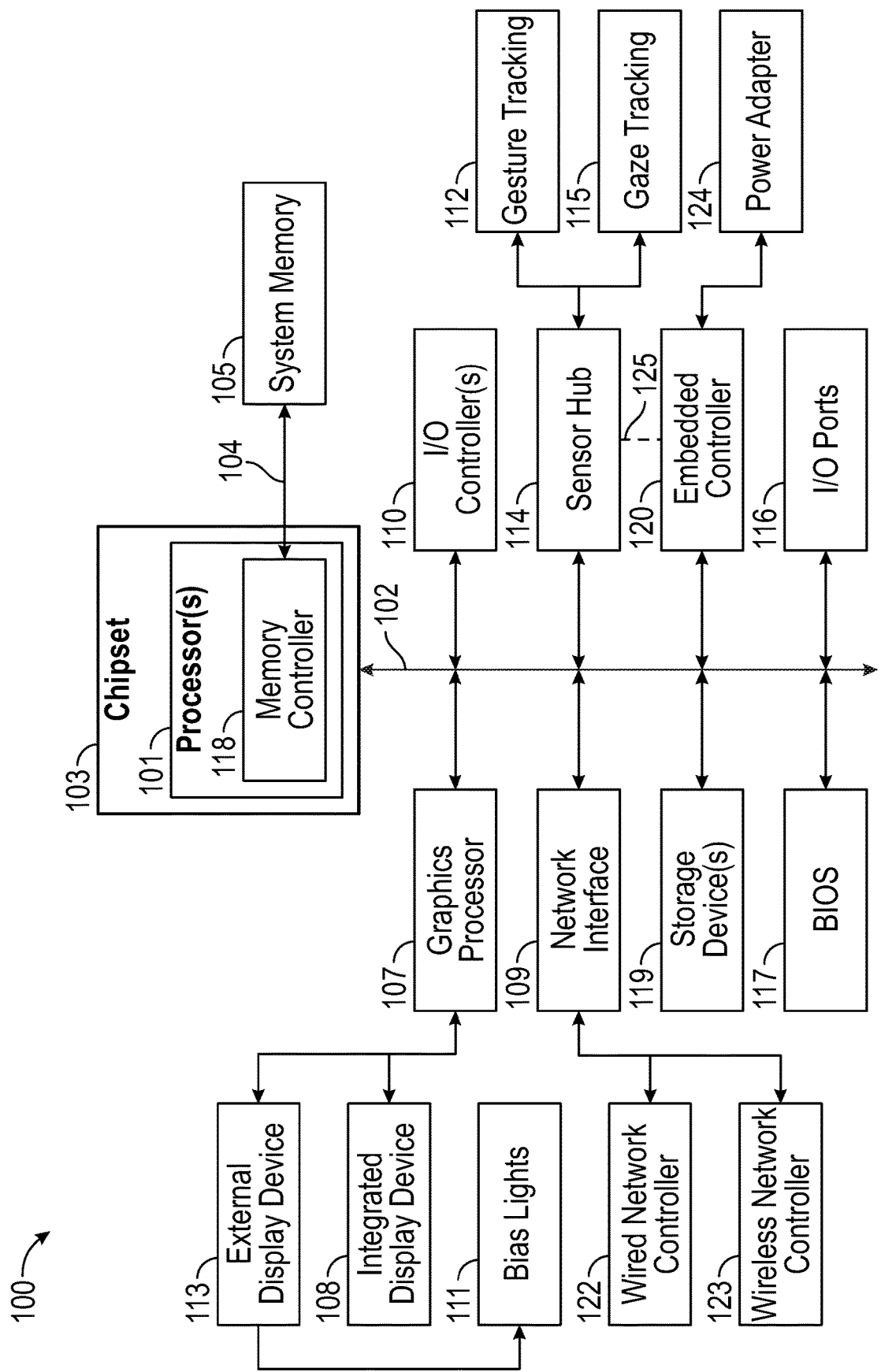
FIG. 1 is a block diagram depicting certain components of an IHS operable according to various embodiments for use with a display that utilizes an adjustable halo for bias lighting.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device utilizing an external display, other embodiments may be utilized.

FIG. 1 is a block diagram illustrating certain components of an IHS 100 configured according to certain embodiments for use with a display that utilizes an adjustable halo for redirection of bias lighting. While a single IHS 100 is illustrated in FIG. 1, IHS 100 may be a component of an enterprise system that may include any number of additional IHSs that may also be configured in the same or similar manner to IHS 100. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized in the operation of applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or via capabilities of graphics processor 107, or via separate microcontroller of IHS 100 that is accessed via bus 102. In some embodiments, IHS 100 may support an integrated display device 108, such as a display integrated into a laptop, tablet, 2-in-1 convertible device, or mobile device.

As described, an IHS 100 may support use of one or more external displays 113, such as external display monitors that may be coupled to IHS 100 via various types of wired and wireless couplings. In addition to supporting couplings to external displays 113 that are designed for use as external monitors for personal computing devices, in certain instances, an IHS 100 may be coupled to a television set for use as an external display 113. As illustrated, IHS 100 includes support for one or more bias lights 111 that may be supported by an external display device 113. In certain embodiments, the operation of bias lights 111 may be configured by the user via software applications that are supported by the operating system of IHS 100. In certain embodiments, the operation of bias lights 111 may be configured via applications executing within a secure execution environment of embedded controller 120. As described in additional detail with regard to FIGS. 3A-C, embodiments support the configuration of external displays with that include a baffle, such as a halo that surrounds the perimeter of the display, that distributes the light output of the bias lights 111 of IHS 100. In certain embodiments, a baffle such as a halo may be adjustable such that the light output of bias lights 111 may be adjusted according to user preferences. In such embodiments, the software applications of IHS 100 may support the configuration of bias lights 111 in a manner that accounts for the position in which the halo is currently adjusted.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100. In certain embodiments, chipset 103 may additionally utilize one or more I/O controllers 110 that may each support the operation of hardware components such as user I/O devices that are physically coupled to an I/O port 116 and/or peripheral components that are wirelessly coupled to IHS 100 via a network interface 109. In various embodiments, I/O controller 110 may support the operation of one or more user I/O devices such as a keyboard, mouse, touchpad, touchscreen, microphone, speakers, camera and other input and output devices that may be coupled to IHS 100.

Certain IHS 100 embodiments may utilize a sensor hub 114 capable of tracking certain aspects of a user of IHS 100, as well as tracking the relative orientation and movement of IHS 100. For instance, sensor hub 114 may utilize inertial movement sensors, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport or in mobile use). In certain embodiments, sensor hub 114 may also include capabilities for determining a location and movement of IHS 100 based on triangulation of network signal information and/or based on information accessible via the operating system or a location subsystem, such as a GPS module. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 to provide an indication of a user's presence near IHS 100.

In certain embodiments, sensor hub 114 may be an independent microcontroller or other logic unit that is coupled to the motherboard of IHS 100. In certain embodiments, sensor hub 114 may be a component of an integrated system-on-chip incorporated into processor 101 In some embodiments, sensor hub 114 may communicate with chipset 103 of processor 101 via a bus connection such as an Inter-Integrated Circuit (I2C) bus or other suitable type of bus connection. Sensor hub 114 may also utilize an I2C bus for communicating with various sensors supported by IHS 100.

IHS 100 embodiments may also utilize an embedded controller 120 that may be a motherboard component of IHS 100 and may include one or more logic units. In certain embodiments, embedded controller 120 may operate from a separate power plane from the main processors 101 and thus the operating system functions of IHS 100. Embedded controller 120 may implement operations for interfacing with a power adapter 124 in managing power for IHS 100. Such operations may be utilized to determine the power status of IHS 100, such as whether IHS 100 is operating from battery power or is plugged into an AC power source. Firmware instructions utilized by embedded controller 120 may be used to operate a secure execution environment that may include operations for providing various core functions of IHS 100, such as power management, management of operating modes in which IHS 100 may be physically configured and support for certain integrated I/O functions. As described, IHS 100 may utilize an external display 113 that supports bias lighting 111 output via an adjustable halo. In certain embodiments, the operations of the secure execution environment of embedded controller 120 may include operations for interfacing with sensors that providing the current position in which a bias lighting baffle of an external display, such as the halo described with regard to FIGS. 3A-C, has been adjusted.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In certain embodiments, IHS 100 may utilize a BIOS (Basic Input/Output System) that may be stored in a non-volatile memory accessible by chipset 103 via bus 102. Upon powering or restarting IHS 100, processor(s) 101 may utilize BIOS instructions to initialize and test hardware components coupled to the IHS 100. The BIOS instructions may also load an operating system for use by the IHS 100. The BIOS provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
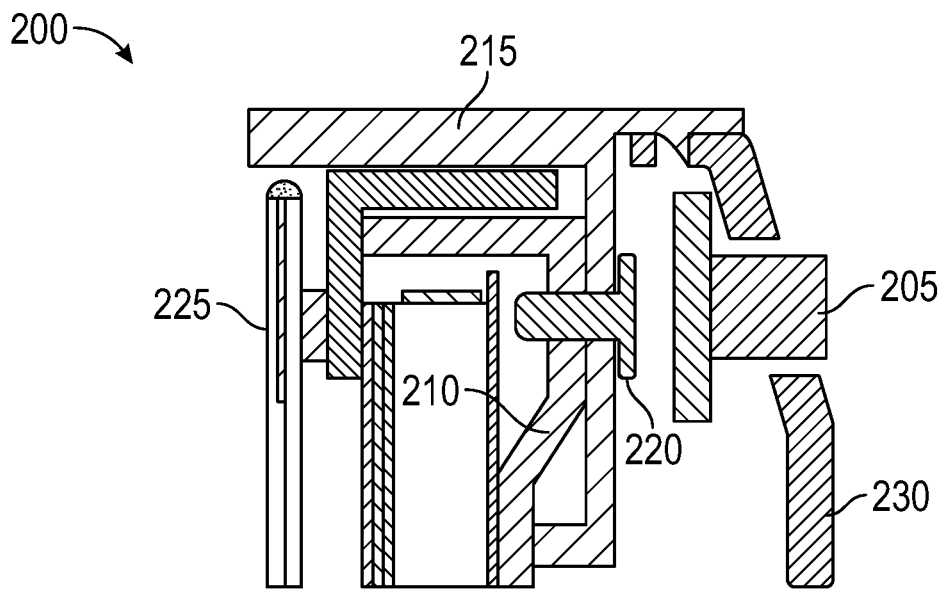
FIG. 2A is a cut-away illustration of a portion of a prior art display that supports bias lighting.

FIG. 2A is a cut-away illustration of a portion of a prior art display 200 that supports bias lighting. The output of display 200 is projected by screen 225 towards the direction of a user facing the screen 225. Installed on the rear side of the display 200 is a bias light 205 that may installed on the rear cover, or as in the illustrated instance, may extend through an opening in a rear cover 230 of display 200. The bias light 205 may be one of many similar bias lights that are installed on the backside of display 200. As illustrated in FIG. 2A, the rear cover 230 may be fixed, such as using screws, to a frame 215 of the display 200. By anchoring the rear cover 230 to the frame 215, the rear cover 230 is fixed to the display 200. In turn, the frame 215 is fixed to an inner cover 210 using a screw 220. In many scenarios, inner cover 210 may be stamped metal and may serve as a base that is attached to the chassis of the display and to which some internal components of the display 200 are attached.

As illustrated, screw 220 is located along the outer edge of the display 220 in order to secure the frame 215, and in turn the rear cover 230, along the edge of the display. In order to maximize the light output of bias light 205 that is visible to the user facing screen 225, bias light 205 is advantageously positioned proximal to the edge of display 225. However, as illustrated, placing the bias light 205 along the edge of the display requires leaving an air gap between back of the bias light 205 and the screw 220 that affixes the frame to the inner cover 210. Without this air gap, heat from bias light 205 would be conducted to the outer frame 215 of the display. Additional heat to an external surface of a display is undesirable and use of internal heat dissipation capabilities of a display is preferred. As described below with regard to FIGS. 3A-C, an external display according to embodiments eliminates the use of frame 215 and attaches the rear cover to the inner cover away from the edge of the display, thus allowing bias lights to be positioned advantageously proximal to the edge of the display while also providing a capability for cooling the bias lights.

Figure 2B:
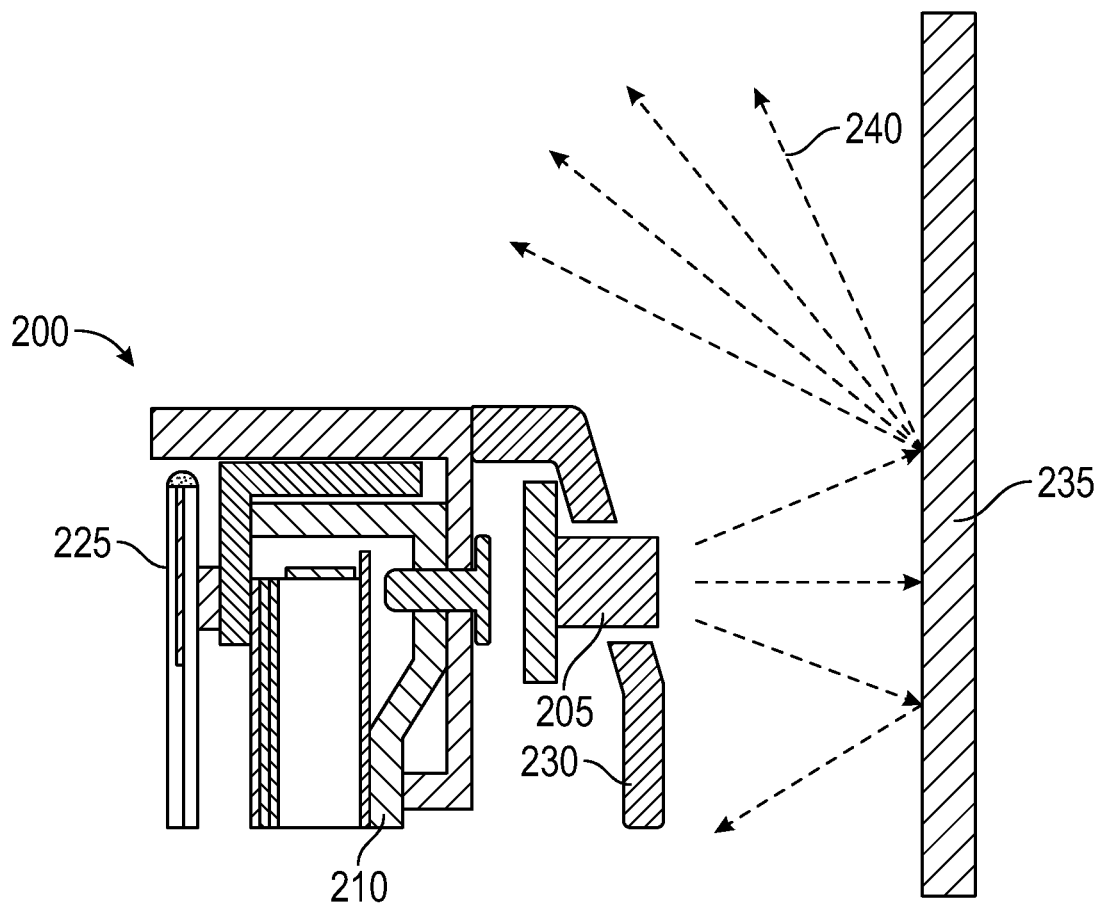
FIG. 2B is a cut-away illustration of bias lighting in operation in a portion of a prior art display.

FIG. 2B is a cut-away illustration of the operation of bias lighting in a portion of a prior art display 200. In operation, bias light 205 emits light output 240, in some instances through a gap or opening in the back cover 230. As illustrated, the light output 240 of bias light 205 is reflected off a surface 235 that is behind the display 200. In various scenarios, display 200 may be positioned in front of a wide variety of different surfaces 235, including walls with various textures, surfaces made of various materials such as stone, brick, wood, concrete and glass, and wallcoverings made of various materials such as wallpaper and fabric. In addition, display 200 may be placed in compartments provided within a variety of different types of furniture. Accordingly, the light output 240 that reaches a user facing screen 225 may be highly variable depending on the surface 235 off which the light output 240 of bias light 205 is reflected. Due to such unpredictability, the operation of bias light 205 may not be reliably tuned without intervention by the user to configure the output of bias light 205 based on the specific surface 235 positioned behind the display 200. As described below with regard to FIGS. 3A-C, an external display according to embodiments utilizes a rear cover that includes an integrated halo or other type of baffle that captures and redirects the output of bias lighting. Using the described halo provides a predictable medium by which bias lighting may be provided and for which bias lighting for a particular type of display can be specially configured.

Figure 3A:
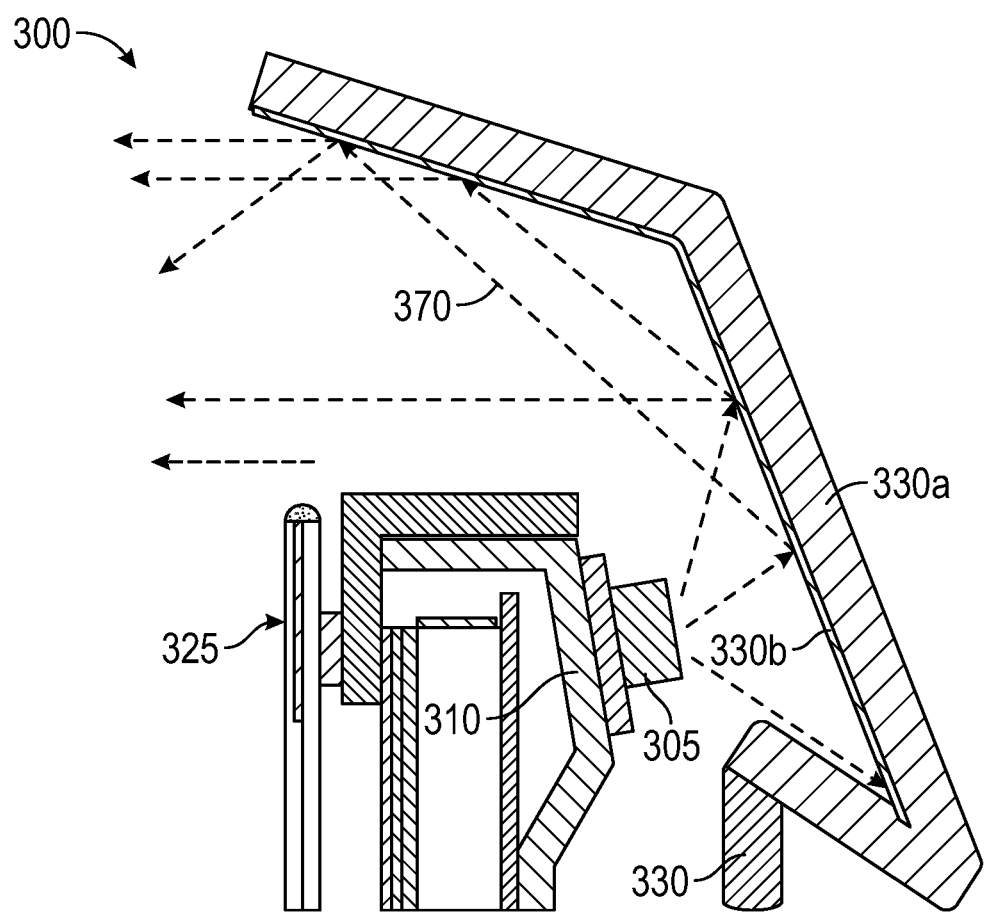
FIG. 3A is a cut-away illustration of bias lighting in operation in a portion of a display according to embodiments that supports adjustable bias lighting via adjustment of a halo.

FIG. 3A is a cut-away illustration of bias lighting in operation within a portion of a display 300 that supports, according to various embodiments, adjustable bias lighting via configuration of a halo-type baffle. In the illustrated embodiment, the output of screen 325 is projected towards a user facing the display 300 and bias lighting 370 is generated via rear-facing bias lights 305. However, as illustrated, the output 370 of bias light 305 is directed towards the user via a halo portion 330a of rear cover 330, where the halo serves as a baffle that redirects the light output 370 of bias light 305. In various embodiments, the halo portion 330a of the rear cover 330 may be a multi-segment baffle designed to for capturing and reflecting the full output 370 of bias light 305 towards a user facing screen 325.

In certain embodiments, some of the segments of a multi-segment baffle may be joined in a manner that allows these segments to be rotated relative to each other, thus allowing the shape of the baffle to be manually adjusted. In various embodiments, a halo 330a may be constructed using any number of segments that support redirection of the output of bias light 305. In certain embodiments, the halo 330a may be a single-segment baffle that may be a one straight segment, a curved shape, or any other suitable shape for redirecting the output of a bias light 305. In various embodiments, multiple bias lights similar to bias light 305 may be located along the edges of display 300 with the output of these bias lights directed towards a user via a halo 330a that extends from the rear cover 330 along one or more of the four edges of the display 300.

Through design of the halo 330a in this manner, a greater portion of the output of bias light 305 may be directed towards the user when compared to the output of a bias light 205 of FIG. 2A in which the output is reflected off of a surface 235 of unknown composition and located at an unknown distance from the rear of the display. Additionally, in the conventional bias lighting of FIG. 2A, a portion of the output of bias light 205 is deflected further behind the display rather than outward, thus resulting in wasted output of bias light 205. Accordingly, through the use of halo 330a, bias lighting may be provided more efficiently than in conventional implementations. In certain embodiments, the inner surface 330b of the halo 333a may be coded with a reflective material that further promotes more efficient redirection of the full output of bias light 305.

Figure 3B:
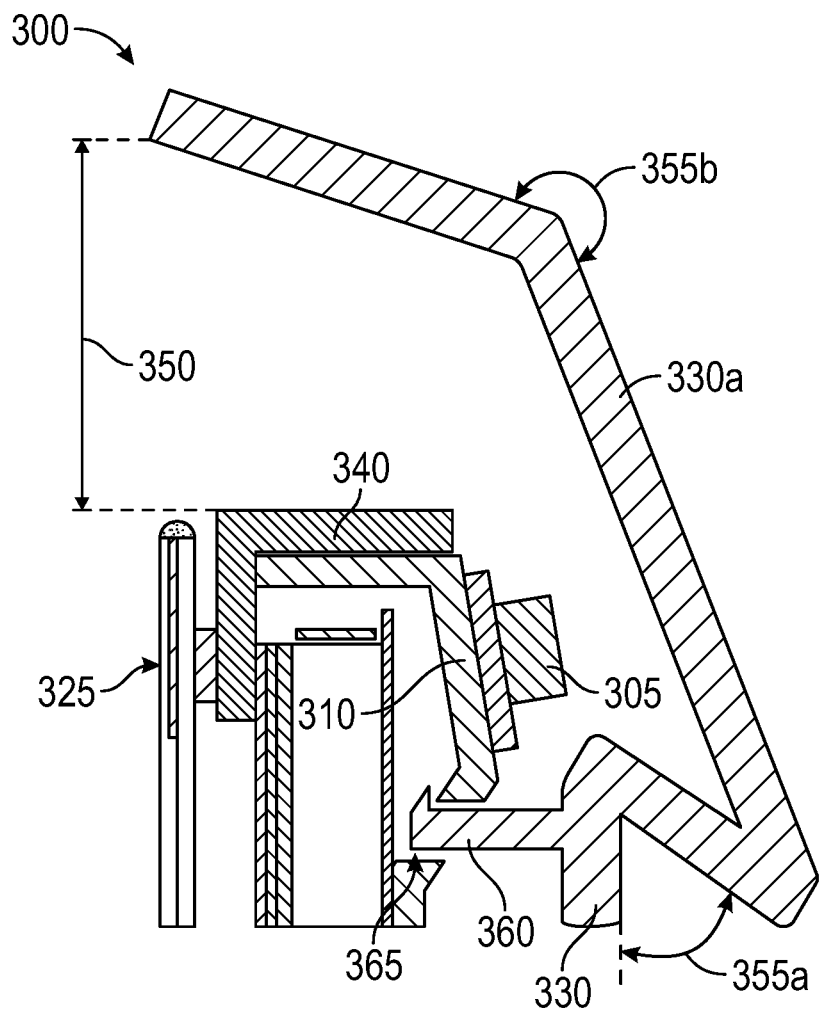
FIG. 3B is a cut-away illustration of a portion of a display that supports adjustable bias lighting via adjustment of a halo according to embodiments, where the halo is adjusted in an open position.

Another improvement illustrated in FIG. 3A is the attachment of the bias light 305 directly to the inner cover 310. As described above with regard to FIG. 2A, a conventional bias light 205 implementation cannot be fixed to the inner cover 210 due to the screw 220 that fixes the frame 215 to the inner cover 210. As illustrated in FIG. 3A, no frame is utilized to attach the rear cover 330 to the inner cover 310. Instead, as illustrated in FIG. 3B, the rear cover 330 may be fixed directly to the rear cover 310 at a location that allows the bias light 305 to be fixed directly to the inner cover 310 and positioned along the edge of the display 300. By fixing the bias light 205 directly to the inner cover 310, heat generated by bias light 205 may be dissipated via the inner cover 210, which may be designed as a heat sink or as a conduit to a heat sink for internal components of the display 300. Also as illustrated in FIG. 3B, the portion of the inner cover 310 to which the bias light 305 is fixed may be designed such that the bias light is tilted towards the edge of the display, thus further improving the ability to capture and direct the full output 370 of bias light 305 towards the user facing screen 325.

FIG. 3B is a cut-away illustration of a portion of a display 300 that supports adjustable bias lighting via configuration of a halo-type baffle according to embodiments, where the halo is configured in an open position. As described with regard to FIG. 3A, rear cover 330 may include a halo portion 330a that serves as a baffle and captures the light output of bias light 305 and directs it towards the user via opening 350 between the leading edge of the halo 330a and the edge of the display 300. In the embodiment illustrated in FIG. 3B, the edge of the display 300 is defined by edge cover 340 to which the screen 325 is affixed and which serves to secure the screen 325 to the inner cover 310. As described in additional detail with regard to FIG. 3C, the opening 350 may be adjusted through bending or rotating the halo 330a at locations such as 355a-b that join segments of a multi-segment halo. In some embodiments, a multi-segment halo 330a may be constructed from plastic segments that may be rotated relative to one another through manipulation of hinges or other articulation mechanisms that connect the panels. In some embodiments, the hinges connecting segments of the halo 330a may include detents that serve to define distinct configurations of the segments of the halo 330a. Via such adjustments to the segments of halo 330a, the characteristics of the output of bias light 305 may be adjusted according to the preferences of a particular user, while utilizing only the surfaces of the halo 330a itself to redirect the output of bias light 305, thus allowing a manufacturer of display 300 to still support reliable tuning of the operation of bias light 305.

In the illustrated configuration, the halo 330a is configured such that the redirected output of bias light 305 is reflected towards the user facing screen 325. In other configurations, the halo 330a may be adjusted in order to widen or narrow the output of the bias light 305 that is emitted from the halo 330a. In other configurations, the joints 335a-b between segments of halo 330a may be adjusted in a more open configuration such that the bias light 305 output may be redirected into more widely into the room in which the display 300 is located, thus providing use of the bias light 305 output as ambient or decorative lighting. In other configurations, the joints 335a-b between segments of halo 330a may be adjusted in a more closed configuration such that the output of bias light 305 is redirected into a narrower beam directed towards a user facing screen 325.

As described with regard to FIG. 2A, in a conventional display, a rear cover 230 is fixed to the inner cover 210 via a frame 215. As illustrated in FIG. 3B, the rear cover 330, according to some embodiments, may be fixed to the inner cover via a hook portion 360 that is received by an opening 365 in the inner cover 310. As illustrated, the hook 360 of the rear cover 330 and the corresponding opening 365 of the inner cover 310 are located further from the edge of the display 300 than the bias light 305 such that bias light 305 may be positioned along the edge of the display 300. By locating the hook 360 attachment of the rear cover 330 in this manner, the bias lights 305 may be positioned distal to the edge of the display while the halo portion 330a wraps around the edge of the display and extends from an attachment at a distal location from the edge. Configured in this manner, the halo 330a is positioned to capture and redirect the full output of bias light 305 while advantageously supporting positioning of the bias light 305 proximal to the edge of the display 300.

Figure 3C:
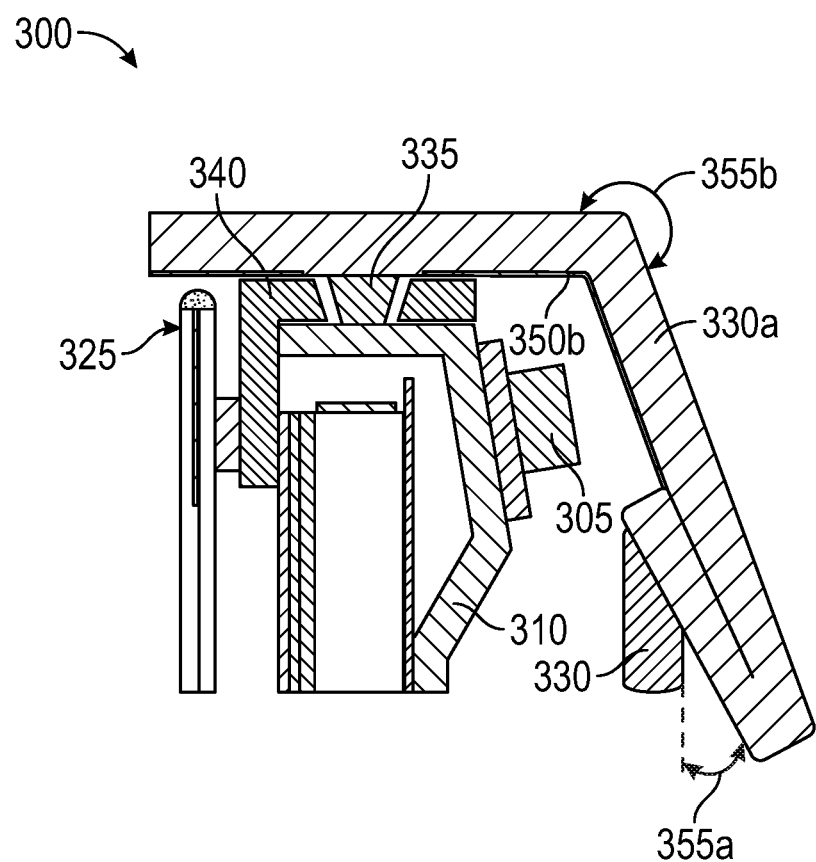
FIG. 3C is a cut-away illustration of a portion of a display that supports adjustable bias lighting via adjustment of a halo according to embodiments, where the halo is adjusted in a closed position.

FIG. 3C is a cut-away illustration of a portion of a display that supports adjustable bias lighting via configuration of a halo-type baffle according to embodiments, where the halo is adjusted in a closed position. As described above, the halo portion 330a of rear cover 330 may be adjusted to change the size of the opening between the halo 330a and the edge of the display 300. As the size of this opening gets smaller through adjustment of the halo 330a, the output of bias light 305 is directed outwards in a narrower beam, thus changing the characteristics of the bias light from the perspective of the user facing screen 325. As illustrated in FIG. 3C, the halo 330a may be configured such that the opening between the halo 330a and the edge of the display 300 is in a closed position. In certain embodiments, the halo 330a may be secured in a closed position through a magnet 335 that is fixed to the halo 330a and attaches to the metal inner cover 310 such that halo 330a is secured against the edge of the display 300. In certain embodiments, the IHS coupled to display 300 may be configured to detect the configuration of the halo 330a in a closed position and to disable the output of bias light 305 while the halo 330a remains in this closed position.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A display for presenting information generated by an Information Handling System (IHS), the display comprising:
   a screen positioned on a front side of the display;
   a plurality of bias lights positioned on a rear side of the display; and
   a baffle connected to the rear side of the display, wherein the baffle redirects light output from the plurality of bias lights.

2. The display of claim 1, wherein the baffle redirects light towards the front side of the display.

3. The display of claim 1, wherein the baffle is adjustable to modify one or more angles of redirection of the bias light output.

4. The display of claim 3, wherein the adjustment of the baffle changes a size of an opening between the baffle and the display.

5. The display of claim 1, wherein a portion of an inner surface of the baffle is coated with a reflective material.

6. The display of claim 1, wherein the baffle is formed from a portion of a rear cover of the display.

7. The display of claim 1, wherein one or more of the bias lights are positioned proximal to an edge of the display and wherein the baffle is connected to the rear side of the display distal from the edge of the display.

8. The display of claim 1, wherein one or more of the bias lights are tilted towards the nearest edge of the display.

9. The display of claim 1, wherein the bias lights dissipate heat via an internal heat sink capability of the display.

10. The display of claim 1, wherein the baffle extends along at least three edges of the display.

11. A system for use with a display comprising a screen positioned on a front side of the display and comprising a plurality of bias lights positioned on a rear side of the display, the system comprising:
    a baffle connected to the rear side of the display, wherein the baffle redirects light output from one or more of the plurality of bias lights, wherein the light output is redirected by the baffle towards the front side of the display.

12. The system of claim 11, wherein the baffle is adjustable to modify one or more angles of redirection of the bias light output.

13. The system of claim 12, wherein the adjustment of the baffle changes a size of an opening between the baffle and the display.

14. The system of claim 11, wherein a portion of an inner surface of the baffle is coated with a reflective material.

15. The system of claim 11, wherein the baffle extends along at least three edges of the display.

16. A system comprising:
    an Information Handling System (IHS) comprising:
        one or more processors; and
        a memory device coupled to the one or more processors, the memory device storing computer-readable instructions that, upon execution by the one or more processors, cause the IHS to generate bias lighting control signals:
    the display comprising:
        a screen positioned on a front side of the display;
        a plurality of bias lights positioned on a rear side of the display, wherein the plurality of bias light are operated based on the bias lighting control signals generated by the IHS; and
        a baffle connected to the rear side of the display, wherein the baffle redirects light output from the plurality of bias lights.

17. The system of claim 16, wherein the baffle redirects light towards the front side of the display.

18. The system of claim 16, wherein the baffle is adjustable to modify one or more angles of redirection of the bias light output.

19. The system of claim 18, wherein the adjustment of the baffle changes a size of an opening between the baffle and the display.

20. The system of claim 16, wherein a portion of an inner surface of the baffle is coated with a reflective material.

* * * * *